June 5, 1951  G. V. WOODY ET AL  2,555,724
LEAF TYPE FILTER
Filed May 22, 1948
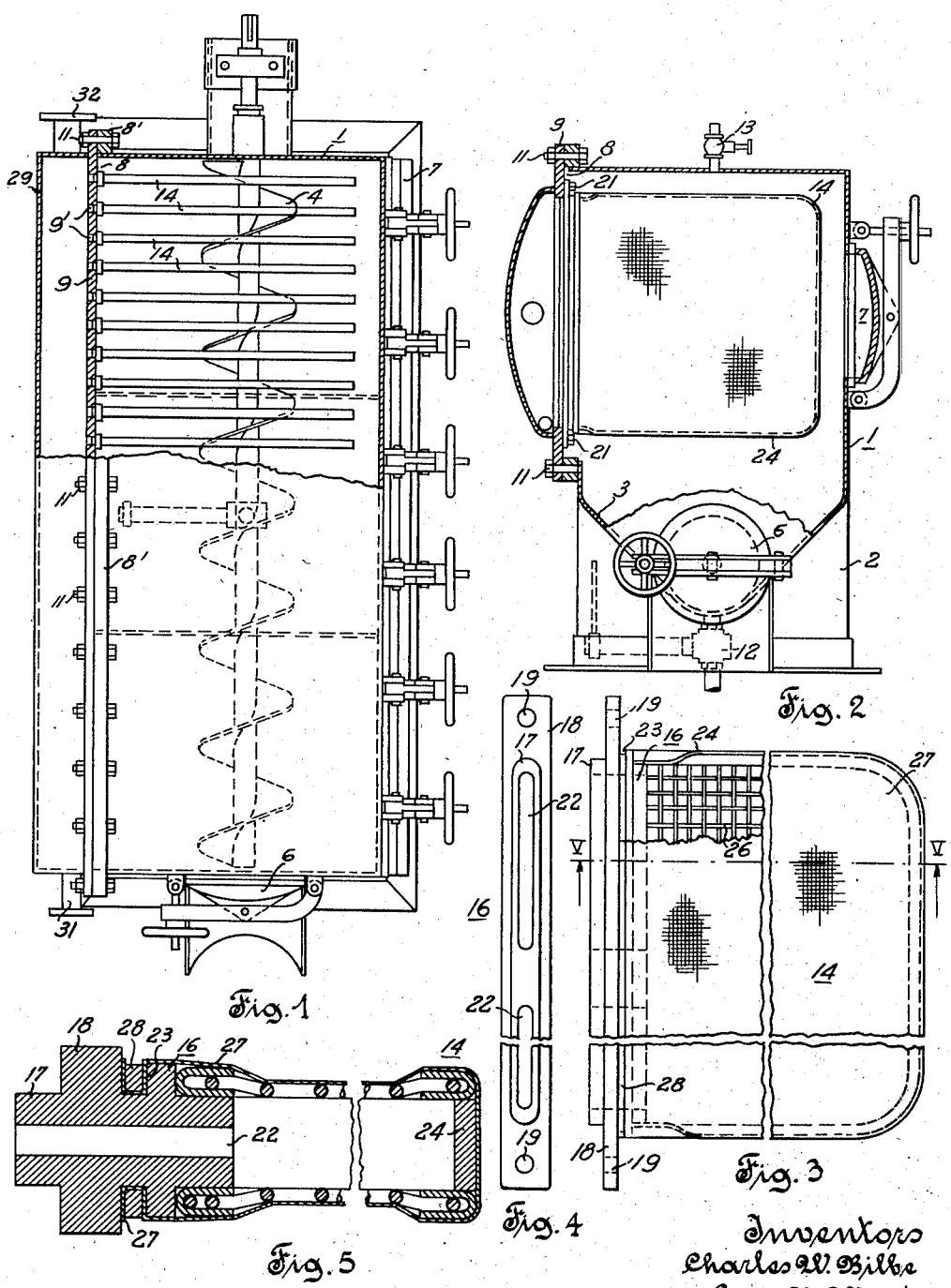
Inventors
Charles W. Bilbe
Guy V. Woody
by William S. Field
Attorney Patented June 5, 1951

2,555,724

UNITED STATES PATENT OFFICE 2,555,724

LEAF TYPE FILTER

Guy V. Woody, Milwaukee, and Charles W. Bilbe, Wauwatosa, Wis., assignors to Allis-Chalmers Manufacturing Company, Milwaukee, Wis., a corporation of Delaware Application May 22, 1948, Serial No. 28,633

1 Claim. (Cl. 210—181)

This invention relates to improvements in filters of the multiple leaf type.

Filters are known to the prior art in which a number of hollow leaf like elements covered with fabric bags or other filtering media are immersed in a tank supplied with the fluid to be filtered, the filtrate being removed from the interiors of the leaves, the solids remaining on the external surface of the leaf and ultimately being removed from the leaves and from the bottom of the tank. One of the principal troubles with known filter constructions of the leaf type is the large number of joints which must be sealed to prevent leakage of the filtrate.

The present invention concerns novel structure for a filter unit having a minimum of external sealed joints.

An object of the invention concerns provision for easy inspection and replacement of filter elements with a minimum disturbance of sealed external joints.

Another object concerns novel structural arrangements to provide for dropping and removal of filter cakes and brushing of bags and at the same time for good filtrate drainage.

More specifically, the invention is in the nature of an ingenious structure providing for removal of an entire multiple filter leaf assembly from the filter tank without disturbing more than a minimum number of sealed joints and in which there are no exposed joints between the filter leaves and filtrate manifold when the filter is assembled for operation.

The invention having the above and still more objects and advantages which may appear hereinbelow may best be carried into practical effect as described hereinbelow with reference to the drawing in which like reference characters indicate the same or similar parts throughout the several views.

Fig. 1 is a plan view of the filter of this invention with portions broken away and partially in cross-section to show internal structure;

Fig. 2 is a front elevation of the filter of Fig. 1 with portions broken away and partially in cross-section to show internal structure;

Fig. 3 is a side view of a filter leaf as shown in Fig. 2 to an enlarged scale with the bag and screen backing partly broken away to show internal structure;

Fig. 4 is an edgewise view of the leaf Fig. 3; and

Fig. 5 is a cross-section of the leaf taken on line V—V of Fig. 3, to a still further enlarged scale.

The invention has been embodied in a preferred form of apparatus illustrated in the drawing and in which 1 is a filter tank or housing supported on suitable supports 2. Tank 1 has the form of a box like housing with a trough like lower portion 3 for receiving settled solids which will be removed during cleaning of a built in screw conveyer 4, discharging through a cleanout door 6 of conventional construction, which is sealed during filtration. A second cleanout door 7 is provided in one lateral wall of the tank opposite to a large rectangular opening 8 in the opposite wall.

Tank 1 is reinforced by a heavy flange 8' about the periphery of opening 8 providing a seat for forming a sealed joint with one face of a header plate 9 which forms the backbone of the filter element assembly. The joint will be secured as by bolts 11. The mixture of fluid and fine solids to be filtered is supplied to tank 1 through a valved supply connection 12, and air may be vented or pressure relieved by a vent connection 13 at the top.

The filter unit proper has, as its backbone, the header plate 9 which has a plurality of parallel slots 9' piercing the plate within an area surrounded by an imperforate peripheral border portion which will be seated in sealed relation to the flange 8' of tank 1 as shown in the drawing. A plurality of filter leaves 14 are secured in edgewise relation to the inner tank side of the header plate 9, preferably in parallel relation to a common reference plane which will be a vertical plane normal to the plane of flange 8' when the header plate and filter leaf assembly are secured in place for operation.

It will be seen from Figs. 3–5 that each filter leaf 14 is composed of a flanged edge member 16 having a tenon portion 17 formed to fit snugly in one of the slots 9' of the header plate 9, the flange 18 having provisions such as holes 19 for accommodation of bolts for securing it to the header plate. Suitable bolts are clearly indicated in Fig. 2 of the drawing at 21. Sealing material (not shown) may be interposed between the flange 18 and the face of the header plate surrounding slot 9'. One or more apertures 22 extend through member 16 normally to the plane of flange 18. The member 16 has a rather deep, narrow groove 23 adjacent the flange 18. A framework 24 is attached to member 16 adjacent its ends and this framework is covered on both sides with a coarse mesh wire screen 26 or other suitable grating to enclose a hollow interior space which is open outwardly through apertures 22 of element 16. A filter bag 27 suitably formed of close woven fabric or other suitable integument is fitted over the framework 24; and its edges are forced into groove 23 and secured therein by forced filling the groove 23 with hammered-in lead wire 28 or other suitable caulking material. It will be noted that the lowest of the apertures 22 permits communication between substantially the lowest part of the interior of the filter leaf 14 and slot 9' of the header plate when the leaf is assembled for use with tank 1.

It is self-evident that when a plurality of filter leaves is assembled as shown on header plate 9, and the header is secured in position against flange 8', that the joints between elements 14 and header plate 9 will be interior and that any leakage from tank 1 through these joints could only reach slots 9'.

Header plate 9 is provided on its exterior face, opposite the filter leaf side, with a filtrate discharge manifold 29 joined in fluid tight relation to external surface of the plate surrounding the area occupied by slots 9'. This manifold takes the form of a box like structure as shown and is provided with a filtrate outlet 31 and an auxiliary connection 32 which can be used for a back pressure inlet for supply of compressed air or other gas to the interior of the leaves for the purpose of reversing the fluid pressure on the bag and dropping the filter cakes.

The dimensions of the filter leaves 14 are such that the assembly of leaves will pass through the opening 8 so that the header and leaf assembly may be attached to and removed from the tank 1 as a unit.

In operation fluid mixture to be filtered is supplied at connection 12, filling the tank, from which air may be vented at 13. The fluid can pass through the integuments, or bags 27, to the interior of the leaves and through apertures 22 and the slots 9' to the interior of manifold 29 on the other side of header plate 9, whence it can pass via filtrate outlet 31 to a point of use or storage. There is a minimum of sealed external joints in the system, namely, the cleanout doors, one header to tank joint, a stuffing box for the screw conveyer drive shaft, and necessary supply, vent and discharge connections. In use, any small leaks at the many joints where the leaves 14 are secured to the header 9 will be unimportant, as the fluid will pass only to the interior of discharge manifold 29 where it belongs, and such small leaks as might occur will be clogged with solids after a short period of operation so that only filtrate can pass. The likelihood of leakage at this point is further reduced in operation by the pressure on the liquid mixture in tank 1 acting to seal the joints between leaves 14 and header plate 9.

For routine cleanouts it will be seen that supply of compressed air at 32 will put back pressure on the filter bags, dislodging the filter cakes which will fall to the trough bottom for removal by the screw conveyer. When desirable, door 7 can be opened and a suitable brush used between the leaves to dislodge solids which will fall to the bottom for removal by the screw conveyer.

At periodic inspection periods the filter leaf assembly may be removed from opening 8 and any worn bags may be individually replaced by removal of the individual leaves, pulling off the bags and replacing, with new caulking at grooves 23. The filter leaf assembly may then be reinserted in the tank, the joint at 8'—9 being the only sealed joint to make.

It will be understood that the specific embodiment described and illustrated herein is illustrative only, and that the invention includes such modifications and equivalents as may readily occur to persons skilled in the art to which it appertains, within the scope of the appended claim.

It is claimed and desired to secure by Letters Patent:

In a filtering device, a housing having spaced side walls, end walls and a top and bottom and an opening in one of said side walls, a cleanout door in the other side wall and a solid material receiving space below the level of said opening and said cleanout door; means for supplying a liquid mixture to said housing, a header plate detachably secured in sealing relation to said housing peripherally of said opening, and having in the area surrounded by the sealed joint, a plurality of apertures extending therethrough; a discharge box encasing the external side of said header plate relatively to said housing and having its interior in communication with said apertures, a plurality of hollow leaf type filter units individually and detachably secured to said header plate in spaced parallel relation to a vertical plane of reference and having their interior spaces in communication with the interior of said box through said apertures at substantially the lowest points of their said interior spaces, said filter units being so formed as to be removable from said housing as a unit with said header plate.

GUY V. WOODY.
CHARLES W. BILBE.

REFERENCES CITED

The following references are of record in the file of this patent:

UNITED STATES PATENTS

| Number | Name | Date |
|---|---|---|
| 928,576 | Anderson | July 20, 1909 |
| 1,218,738 | Zahm | Mar. 13, 1917 |
| 1,992,101 | Stuart | Feb. 19, 1935 |

FOREIGN PATENTS

| Number | Country | Date |
|---|---|---|
| 288,920 | Great Britain | Apr. 19, 1928 |
| 291,810 | Great Britain | June 8, 1928 |
| 354,739 | Great Britain | Aug. 10, 1931 |
| 9,913 | France | Dec. 22, 1908 |
|  | (first addition to 343,585) | |